Figure 4:
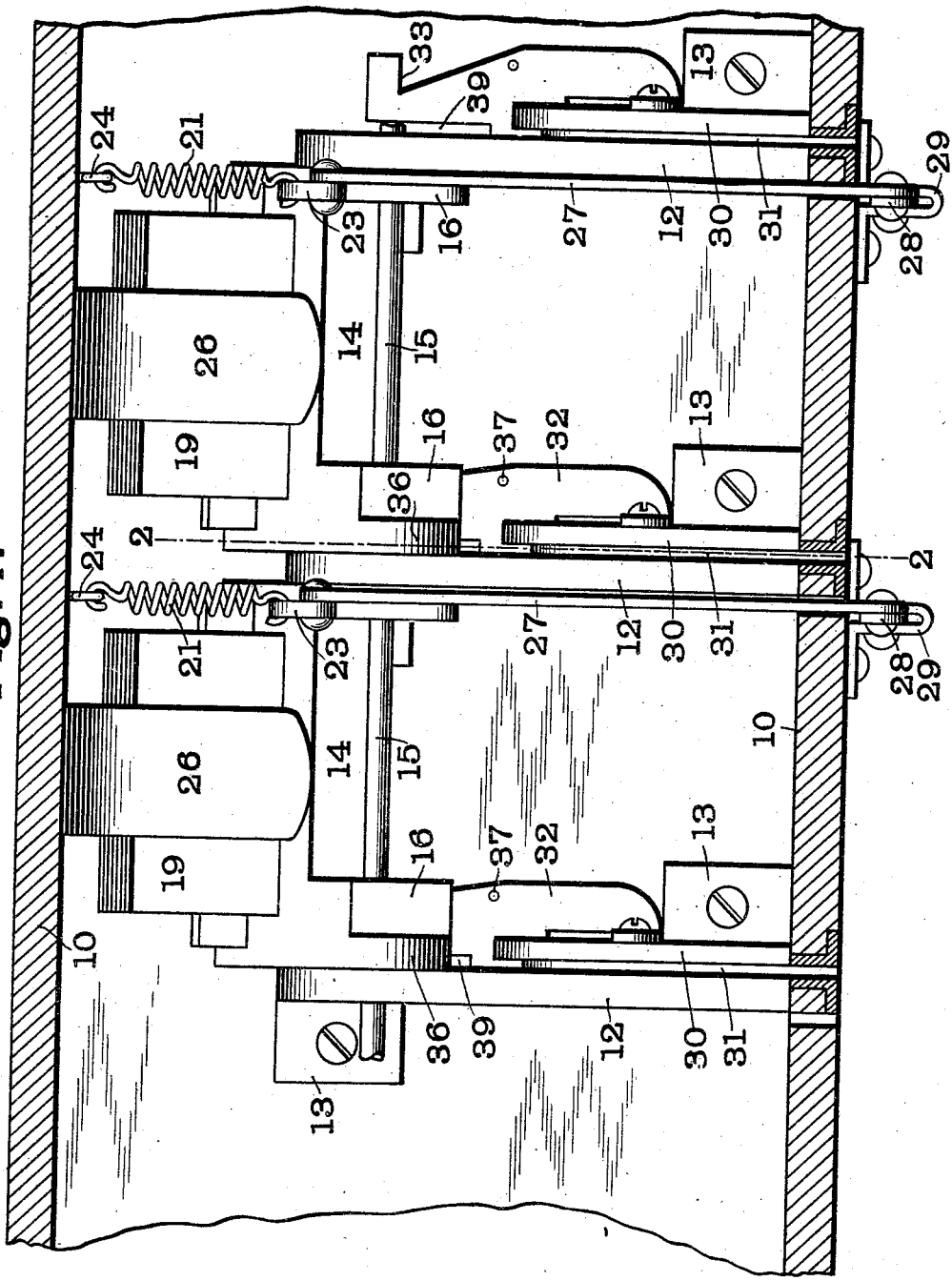

A. G. KENNEL.
COIN CONTROLLED APPARATUS.
APPLICATION FILED JUNE 9, 1909.
940,973.
Patented Nov. 23, 1909.
2 SHEETS—SHEET 1.
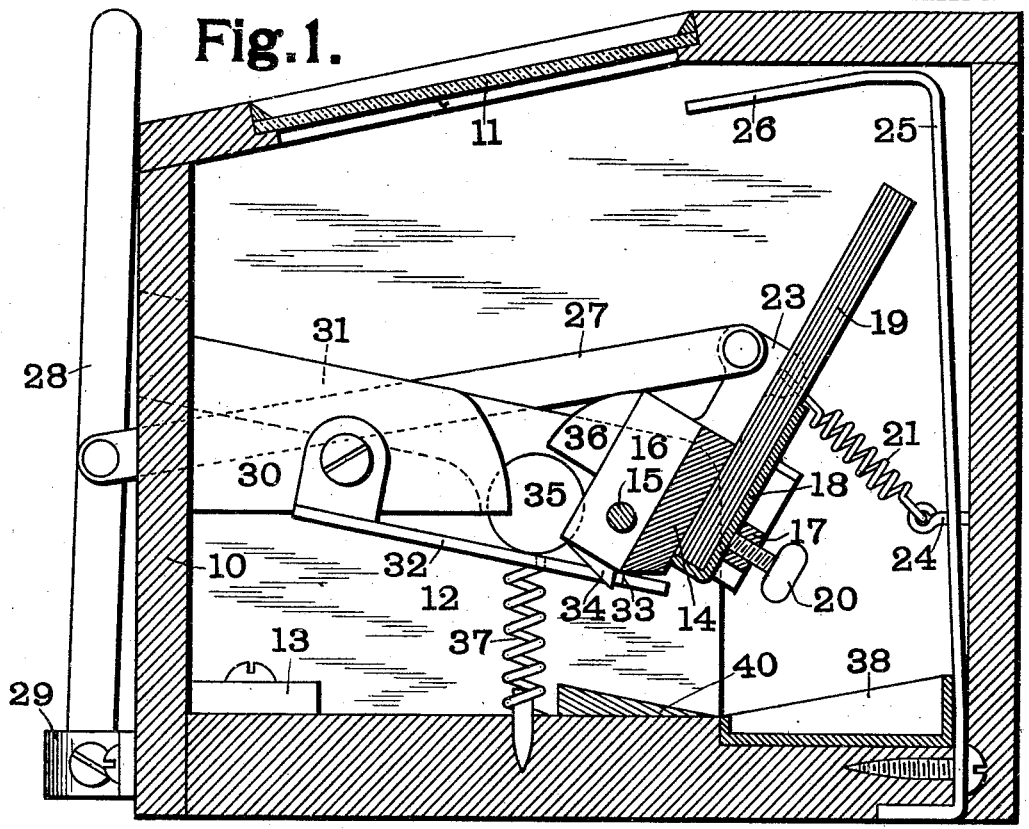
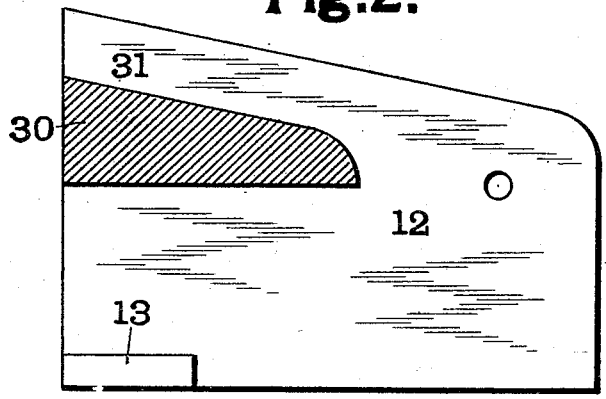
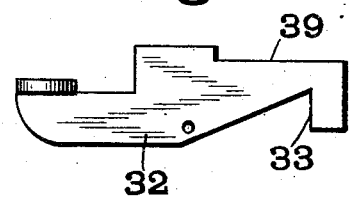
WITNESSES:
L. L. Mead.
W. H. Alexander.
INVENTOR
Arthur G. Kennel
BY
Fawler & Huffman
ATTORNEYS

A. G. KENNEL.
COIN CONTROLLED APPARATUS.
APPLICATION FILED JUNE 9, 1909.

940,973.

Patented Nov. 23, 1909.
2 SHEETS—SHEET 2.

WITNESSES:
L. L. Mead.
W. H. Alexander.

INVENTOR
Arthur G. Kennel
BY
Fowler & Huffman
ATTORNEYS

UNITED STATES PATENT OFFICE.

ARTHUR G. KENNEL, OF ST. LOUIS, MISSOURI, ASSIGNOR TO KENNEL MACHINE COMPANY, OF ST. LOUIS, MISSOURI, A CORPORATION OF MISSOURI.

COIN-CONTROLLED APPARATUS.

940,973.          Specification of Letters Patent.      Patented Nov. 23, 1909.

Application filed June 9, 1909. Serial No. 501,104.

*To all whom it may concern:*

Be it known that I, ARTHUR G. KENNEL, a citizen of the United States, residing at the city of St. Louis, in the State of Missouri, have invented a certain new and useful Coin - Controlled Apparatus, of which the following is such a full, clear, and exact description as will enable any one skilled in the art to which it appertains to make and use the same, reference being had to the accompanying drawings, forming part of this specification.

My invention relates to a coin controlled apparatus and is especially adapted for exhibiting motion pictures of the kind known as separate leaf kinetoscopes.

In the accompanying drawings which illustrate one form of apparatus made in accordance with my invention, Figure 1 is a vertical cross-section; Fig. 2 is a vertical section on the line 2—2 of Fig. 4; Fig. 3 is a detailed view of the locking device and Fig. 4 is a top plan view, the casing being shown in section.

Like marks of reference refer to similar parts in the several views of the drawings.

10 is the casing which may be of any suitable form and is provided with a glazed opening 11 for viewing the pictures. Within the casing 10 are a number of frames 12 which are secured to the bottom of the casing 10 by means of brackets 13. Pivoted between each pair of frames 12 is a member 14 adapted to hold a package of leaves containing the pictures. The members 14 are secured in position by means of a pivot rod 15 preferably extending through forward projections 16 on the members 14. Each of the members 14 is provided with a yoke 17 adapted to receive a metal container 18 in which are arranged the leaves 19 carrying the pictures. The retainer 18 is supported in position by means of a screw 20. The member 14 is held in its normal position as best shown in Fig. 1 by means of a coil spring 21, one end of which is attached to an upwardly extending arm 23 on the member 14 and the other to a hook 24 secured in the rear wall of the casing 10. Extending upwardly from the bottom of the casing 10 is a metal strip 25, the upper end of which is turned over at 26 so as to engage with the upper edges of the leaves 19 when the same are pulled forward and thus arrest their movement and release them successively so as to properly exhibit the pictures thereon.

In order to operate the member 14 I provide a link 27, one end of which is pivoted to the arm 23 and the other to a lever 28 which is in turn pivoted to a bracket 29 carried on the front wall of the casing 10.

Formed integral with each of the frames 12 is an extension 30 in which is formed a coin slot 31. Secured to each of the extensions 30 is a locking member 32 having an offset 33 adapted to engage with a detent 34 on the member 14 and thus prevent the said member 14 from being moved until the locking device is released by the insertion of a coin. When the coin 35 is introduced into the slot 31 it moves downwardly and rearwardly until it rests upon the locking member 32. The coin is then adapted to be engaged by means of a lug 36 carried on one of the extensions 16 of the frame 14. The coin thus presses the locking member of Fig. 2 out of engagement with the detent 34 and allows the frame to be moved forward by manipulation of the lever 28. The locking member 32 may be held in position by its own resiliency or it may be held by means of a coil spring 37 as shown in Fig. 1 of the drawings.

38 is a tray adapted to receive the coins 35 after they are forced down through the slots 39 in the locking members 32. An inclined guide block 40 is preferably provided for guiding the coins into the tray 38.

The operation of my device will be evident from the above description. When a coin is dropped into the slot 31 it comes between the locking member 32 and the lug 36 and hence the movement of the handle 28 will release the locking device and allow the member 14 to be rocked on its pivot 15 so as to display the pictures on the leaves 19.

Having fully described my invention, what I claim as new and desire to secure by Letters Patent of the United States is:

1. In a coin controlled machine, the combination with the pivotally mounted member 14, provided with the detent 34 and lug 36, of the spring mounted locking member 32, arranged to support the coin in the path of the lug 36, provided with the offset 33, engaging the detent 34, and having a slot 39, for the passage of the coin, and means for operating the member 14.

2. In a coin controlled machine, the combination with the casing 10, of the pivotally mounted member 14, provided with the detent 34, and lug 36, the spring mounted locking member 32, arranged to support the coin in the path of the lug 36, and provided with the offset 33 engaging the detent 34, and having the slot 39 for the passage of the coin, the link 27 pivoted to the member 14, and the lever 28 pivoted outside of the casing 10 and attached to the link 27.

3. In a coin controlled machine, the combination with the frame 12, provided with the integral extension 30, having the slot 31, of the member 14 pivoted to said frame 10 and provided with the detent 34 and lug 36, the spring locking member 32 mounted on the extension 30 to support the coin in the path of the lug 36, and provided with the offset 33 engaging the detent 34 and having the slot 39 for the passage of the coin and, means for operating the member 14.

4. In a coin controlled machine, the combination with the casing 10, of the frame 12, provided with the integral extension 30, having the coin slot 31, the member 14 pivoted to said frame 10 and provided with the detent 34 and lug 36, and the spring locking member 32 mounted on the extension 30 to support the coin in the path of the lug 36, the link 27 pivoted to the member 14, and the lever 28 pivoted outside of the casing 10 and attached to the link 27.

In testimony whereof I have hereunto set my hand and affixed my seal in the presence of the two subscribing witnesses.

A. G. KENNEL. [L. s.]

Witnesses:
 W. A. ALEXANDER,
 E. E. HUFFMAN.